United States Patent [19]
Habbab et al.

[11] Patent Number: 5,946,360
[45] Date of Patent: Aug. 31, 1999

[54] FREQUENCY OFFSET COMPENSATION USING DOTTING SEQUENCES

[75] Inventors: Isam M. I. Habbab, Holmdel; Sanjay Kasturia, Middletown, both of N.J.

[73] Assignee: Lucent Technologies Inc., Murray Hill, N.J.

[21] Appl. No.: 08/826,416

[22] Filed: Mar. 27, 1997

[51] Int. Cl.$^6$ ...................................................... H04L 27/22
[52] U.S. Cl. .......................... 375/331; 375/326; 375/362; 329/304
[58] Field of Search ...................................... 375/279–281, 375/283, 324, 326, 329–332, 354, 362, 365, 368, 328; 370/503, 509–514, 516; 327/141, 155; 329/304, 306

[56] References Cited

U.S. PATENT DOCUMENTS

| | | | |
|---|---|---|---|
| 5,151,926 | 9/1992 | Chennakeshu et al. | 375/333 |
| 5,422,917 | 6/1995 | Scott | 375/371 |
| 5,511,098 | 4/1996 | Gardner | 375/340 |

*Primary Examiner*—Young T. Tse

[57] ABSTRACT

The along and perpendicular rails of a received signal (e.g., modulated using multi-phase shift keying) are rotated to compensate for frequency offsets between the carrier frequency of the received signal and the reference frequency of the local oscillator. The rotation angles are updated, based on the rotated along rail, during dotting sequences in the received signal. In one implementation, the dotting sequences are detected based on the rotated perpendicular rail. The beginnings of dotting sequences are detected by thresholding the average on the perpendicular rail, and the ends of dotting sequences are detected by analyzing the encoded data for non-dotting-sequence values. In a cordless phone application, different dotting sequences may be used to distinguish base-to-handset transmissions from handset-to-base transmissions.

11 Claims, 3 Drawing Sheets

FREQUENCY OFFSET COMPENSATION USING DOTTING SEQUENCES

BACKGROUND OF THE INVENTION

1. Field of the Invention

The present invention relates to signal processing, and, in particular, to the compensation of frequency offsets in decoding received signals.

2. Description of the Related Art

In certain modulation schemes, such as multi-phase shift keying, frequency offsets between the carrier frequency of a received signal and the local oscillator frequency of the receiver can inhibit the ability of the receiver to accurately decode the information contained in the received signal. For example, in a cordless telephone communication system, there may be a frequency offset between the signal received by a cordless phone from a base station and the frequency of the local oscillator in the cordless phone handset.

If the telephone equipment is designed with expensive crystal oscillators, the frequency offset between the carrier and the local oscillator can be kept to within a few percentage points of the baud rate. For example, in a communication system having a baud rate of 100 kbaud/sec, expensive crystal oscillators can be used keep the frequency offset to within about 1 kHz.

Unfortunately, using expensive crystal oscillators adds significantly to the cost of the cordless phone equipment. Using less expensive oscillators would keep phone equipment costs down, but would result in larger frequency offsets. For example, in a relatively inexpensive system having a baud rate of 100 kbaud/sec, frequency offsets could be as large as ±20 kHz, implying a frequency offset range of up to 40% of the baud rate.

SUMMARY OF THE INVENTION

The present invention is directed to a signal processing scheme that can handle large frequency offsets between the received signal and the local oscillator in certain modulation schemes.

In one embodiment, the present invention is a method for compensating for frequency offset in a received signal having dotting sequences. Occurrences of the dotting sequences are detected in the received signal, and a rotation angle is generated based on the received signal during each dotting sequence. The received signal is rotated by the rotation angle to compensate for the frequency offset.

In another embodiment, the present invention is an apparatus for compensating for frequency offset in a received signal having dotting sequences. The apparatus comprises a rotator, a dotting detector, a phase tracker, and a switch. The rotator is adapted to receive a rotation angle and rotate along rail and perpendicular rail components of the received signal to generate rotated along rail and rotated perpendicular rail components. The dotting detector is adapted to use the rotated perpendicular rail components to detect occurrences of the dotting sequences. The phase tracker is adapted to use the rotated along rail components to generate the rotation angle. The switch is adapted to be controlled by the dotting detector to enable and disable transmission of the rotation angle to the rotator based on the occurrences of the dotting sequences.

In yet another embodiment, the present invention is a method for communications between one or more bases and one or more remote units. A first signal is transmitted from a base to a remote unit, the first signal comprising a first dotting sequence. A second signal is transmitted from the remote unit to the base, the second signal comprising a second dotting sequence different from the first dotting sequence. It is then determined whether a received signal is the first signal or the second signal based on the sign and magnitude of an average along a perpendicular rail of the received signal.

In still another embodiment, the present invention is a communications apparatus, comprising a transmitter, a receiver, and a switch. The transmitter is adapted to selectively transmit signals in a first mode and signals in a second mode. The receiver is adapted to selectively receive signals in the first mode and signals in the second mode. The switch is adapted to selectively enable the transmitter and the receiver to operate either in the first mode or in the second mode. In the first mode, the transmitter transmits signals comprising a first dotting sequence and the receiver receives signals comprising a second dotting sequence different from the first dotting sequence. In the second mode, the transmitter transmits signals comprising the second dotting sequence and the receiver receives signals comprising the first dotting sequence.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Embodiments of the present invention are directed to signal processing schemes that use the dotting sequences of certain modulated signals to detect and compensate for frequency offsets between the received signal and the local oscillator reference signal. In certain modulation schemes, such as multi-phase shift keying, dotting sequences are encoded along with data in the modulated signal. These dotting sequences may be used for such things as data acquisition, power measurements, synchronization, timing recover, and antenna selection. For example, in π/4 differential quadrature phase shift key (DQPSK) modulation, dotting sequences such as (+1, +3, +1, +3, . . . ) may be embedded in a frame and delineated on both sides by random data. According to the present invention, the receiver recognizes the presence of these sequences in order to invoke a frequency compensation operation. In particular, the received signal is analyzed during the dotting sequences to characterize the direction and magnitude of the frequency offset, which are then used to compensate the received signal.

Figure 1:
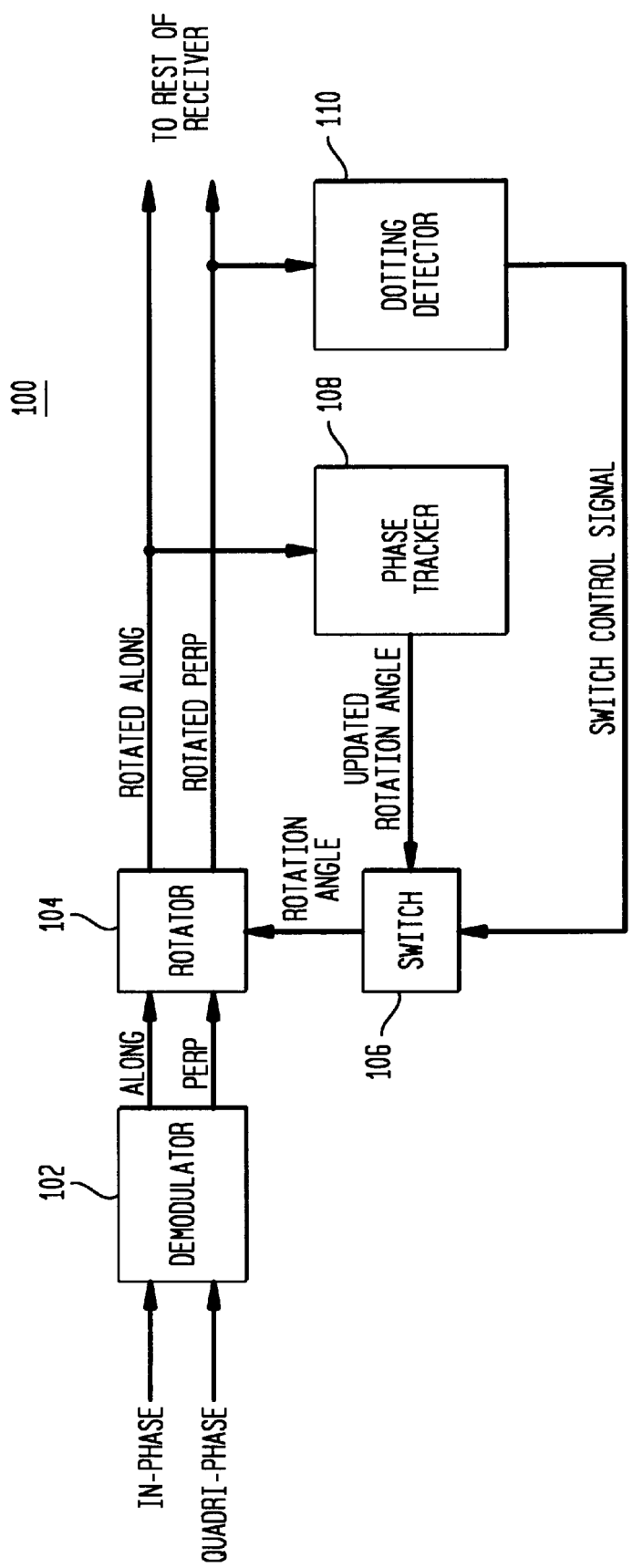
FIG. 1 shows a high-level block diagram of a frequency offset compensator, according to one embodiment of the present invention.

FIG. 1 shows a high-level block diagram of frequency offset compensator 100, according to one embodiment of the present invention. Compensator 100 operates in baseband to detect and compensate for frequency offsets in a received DQPSK modulated signal. Compensator 100 receives the in-phase and quadri-phase rails that are generated by mixing the received signal with a local oscillator reference signal (not shown in FIG. 1). If there is a frequency offset between the carrier frequency of the received signal and the local oscillator frequency, then the in-phase and quadri-phase rails will be affected by that frequency offset.

Compensator 100 processes the in-phase and quadri-phase rails to detect the occurrences of dotting sequences in the received signal and then characterizes the frequency offset during those dotting sequences. Compensator 100 then uses the characterized frequency offset to rotate the received signal to compensate for the frequency offset to generate rotated signals, which may then be further processed by the receiver using conventional signal processing to decode the information contained in the received signal (not shown in FIG. 1).

In particular, demodulator 102 of FIG. 1 converts the in-phase and quadri-phase rails of the received signal into along and perpendicular rails. Rotator 104 rotates the along and perpendicular rails by a rotation angle updated by switch 106 to compensate the received signal for frequency offset. Phase tracker 108 tracks the frequency offset in the received signal and generates updated rotation angles to compensate for that frequency offset. Dotting detector 110 detects the dotting sequences in the received signal and controls the operations of switch 106 such that only the updated rotation angles from phase tracker 108 that are characterized during the dotting sequences are transmitted to rotator 104.

Figure 2:
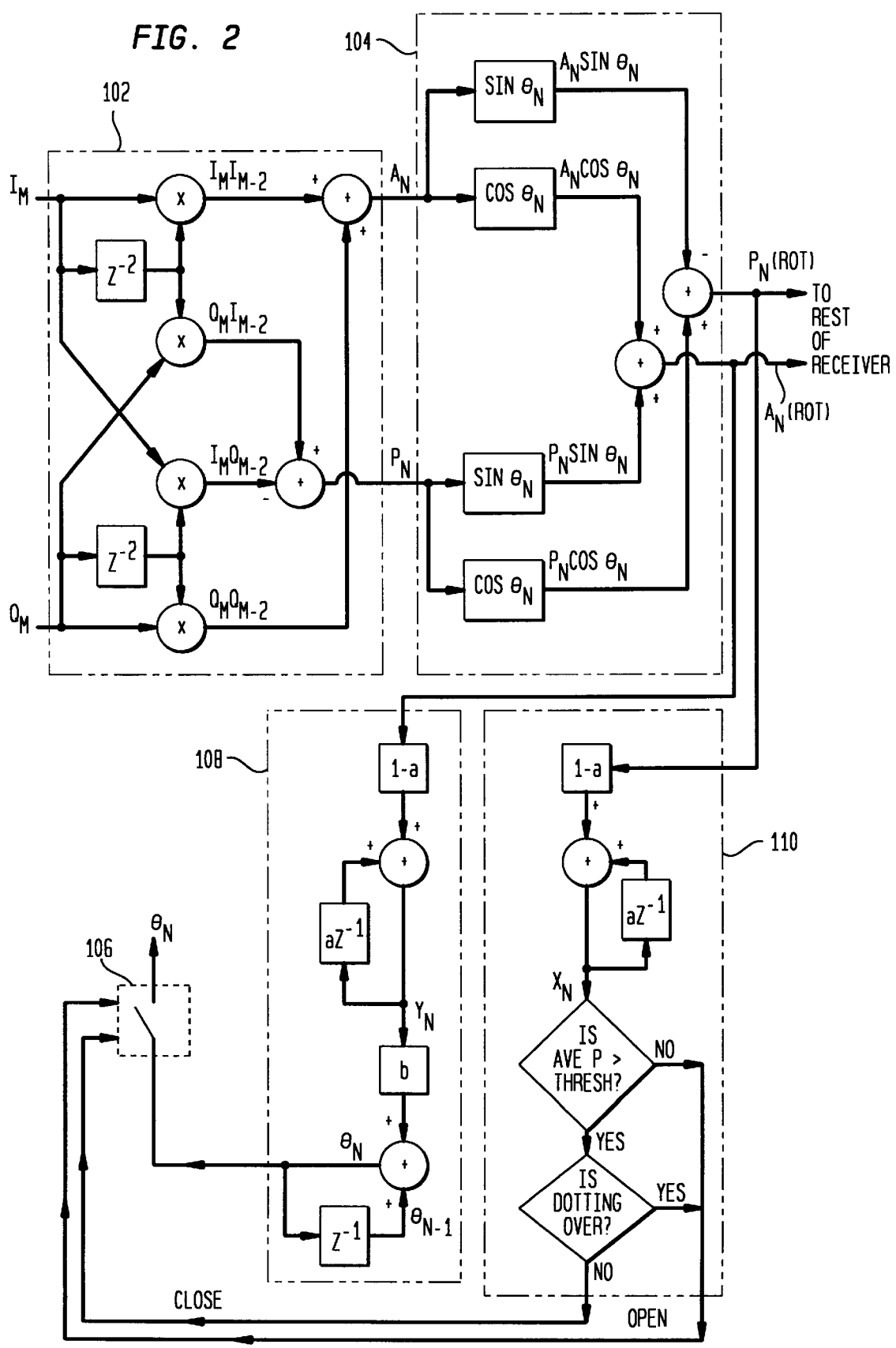
FIG. 2 is a more detailed block diagram of the frequency offset compensator of FIG. 1.

Referring now to FIG. 2, there is shown a more detailed block diagram of frequency offset compensator 100 of FIG. 1, according to one embodiment of the present invention. The processing applied by demodulator 102 as represented in FIG. 2 can be expressed by Equations (1) and (2) as follows:

$$A(m) = I(m)I(m-2) + Q(m)Q(m-2) \quad (1)$$

$$P(m) = Q(m)I(m-2) - I(m)Q(m-2) \quad (2)$$

where A(m) is the along rail, P(m) is the perpendicular rail, and m is the sample index.

In $\pi/4$ DQPSK modulation, information is encoded in using the values $-3$, $-1$, $+1$, and $+3$, where each increment of information corresponds to a phase increment in the signal of $\pi/4$ radians (i.e., 45 degrees). For example, a value of $+1$ is encoded as a phase increment of $\pi/4$ and a value of $+3$ is encoded as a phase increment of $3\pi/4$. Thus, the dotting sequence $(+1, +3, +1, +3, \ldots)$ is encoded using $\pi/4$ DQPSK modulation as the following sequence of transmitted angles:

$$0, \pi/4, \pi, 5\pi/4, 0, \pi/4, \pi, 5\pi/4,$$

where $2\pi$ is equivalent to 0.

Using symbol indices n instead of sample indices m, the demodulation operation of Equations (1) and (2) can be written according to Equations (3) and (4) as follows:

$$A(n) = \cos\theta(n)\cos\theta(n-1) + \sin\theta(n)\sin\theta(n-1) \quad (3)$$
$$= \cos(\theta(n) - \theta(n-1))$$

$$P(n) = \sin\theta(n)\cos\theta(n-1) + \cos\theta(n)\sin\theta(n-1) \quad (4)$$
$$= \sin(\theta(n) - \theta(n-1))$$

where $I_n = \cos\theta(n)$, $Q_n = \sin\theta(n)$, and $\theta(n)$ is the current phase angle.

Assuming a frequency offset of $\Delta\omega$, the received samples on the in-phase rail $I_n$ (before demodulation) during a dotting sequence are as follows:

$$\cos(\Delta\omega T), \cos\left(\frac{\pi}{4} + 2\Delta\omega T\right), \cos(\pi + 3\Delta\omega T), \quad (5)$$

$$\cos\left(5\frac{\pi}{4} + 4\Delta\omega T\right), \cos(5\Delta\omega T), \ldots$$

where T is the sampling interval and the frequency offset $\Delta\omega$ accumulates with each sample. According to Equation (3), during dotting, the along rail A(n) alternates between the two samples $$\cos\left(\frac{\pi}{4} + \Delta\omega T\right) \text{ and } \cos\left(3\frac{\pi}{4} + \Delta\omega T\right).$$

The average on the along rail A(n) during dotting therefore is given by Equation (6) as follows:

$$\langle A \rangle = \frac{\cos\left(\frac{\pi}{4} + \Delta\omega T\right) + \cos\left(3\frac{\pi}{4} + \Delta\omega T\right)}{2} = \frac{-\sin(\Delta\omega T)}{\sqrt{2}} \quad (6)$$

Since the average on the along rail during dotting has odd symmetry around $\Delta\omega T=0$, the along average (A) of Equation (6) can be used as a discriminating signal for frequency offset. A negative average on the along rail indicates the presence of a positive frequency offset, and a positive average on the along rail indicates the presence of a negative frequency offset.

Similarly, using Equation (4), it can be shown that the average on the perpendicular rail P(n) during dotting is given by Equation (7) as follows:

$$\langle P \rangle = \frac{\sin\left(\frac{\pi}{4} + \Delta\omega T\right) + \sin\left(3\frac{\pi}{4} + \Delta\omega T\right)}{2} = \frac{\cos(\Delta\omega T)}{\sqrt{2}} \quad (7)$$

As described below, the perpendicular average <P> as given by Equation (7) can be used to detect the presence of dotting sequences in the received signal.

Since real data is typically balanced to a large extent, during the non-dotting, data-transmission sequences, the perpendicular average <P> will be close to zero. During the dotting sequences, however, the perpendicular average <P> as given by Equation (7) will be relatively large, even in the presence of a large frequency offset. For example, assuming a sampling frequency of 200 kHz, even with a large frequency offset of 20 kHz, the perpendicular average <P> during dotting according to Equation (7) is still relatively large (0.57). As such, the occurrence of dotting sequences in the received signal can be detected by comparing the perpendicular average <P> to an appropriate threshold value (e.g., 0.40). If the perpendicular average <P> is greater than the threshold, then a dotting sequence is determined to be present.

Referring again to FIG. 2, rotator 104 rotates the along and perpendicular rails generated by demodulator 102, by the rotation angle $\theta_N$ received from switch 106. In addition to being transmitted to the rest of the receiver for further signal processing, the rotated along rail is transmitted to phase tracker 108 and the rotated perpendicular rail is transmitted to dotting detector 110.

Phase tracker 108 performs filtering and other processing on the rotated along rail based on the relationship of Equation (6) to update the rotation angle $\theta_N$ that is used by rotator 104 to compensate the received signal for frequency offset. Since Equation (6) is valid only during the dotting sequences, dotting detector 110 performs filtering and other processing on the rotated perpendicular rail based on the relationship of Equation (7) to detect the occurrences of dotting sequences in the received signal, thereby enabling dotting detector 110 to control the opening and closing of switch 106 such that the rotation angle $\theta_N$ received by rotator 104 is updated only during the dotting sequences. In between dotting sequences (i.e., during non-dotting data-transmission sequences), rotator 104 continues to use the previous updated value for the rotation angle $\theta_N$.

In particular, the processing of phase tracker 108 can be represented by Equations (8) and (9), as follows:

$$Y_N = (1 - a)A_N(ROT) + aY_{N-1} \qquad (8)$$

$$\theta_N = bY_N + \theta_{N-1} \qquad (9)$$

where a and b are variable parameters.

Similarly, the filter processing of dotting detector 110 can be represented by Equation (10), as follows:

$$X_N = (1-a)P_N(ROT) + aX_{N-1} \qquad (10)$$

The filter processing of dotting detector 110 effectively generates an average value for the rotated perpendicular rail. As described earlier in connection with Equation (7), the perpendicular average <P> can be thresholded to detect the occurrence of dotting sequences in the received signal. The filtering of dotting detector 110 introduces lag into the calculation of the perpendicular average. This lag means that the filtering does not generate an instantaneous value for the current average along the perpendicular rail. As such, thresholding the perpendicular average <P> will not be able to detect the precise end of a dotting sequence. As a result, switch 106 would remain closed and the rotation angle $\theta_N$ would continue to be updated during the initial portion of a non-dotting sequence. This could adversely affect the accuracy of the offset frequency compensation performed by compensator 100.

To address this potential problem, the end of each dotting sequence is preferably detected by analyzing the decoded dotting sequence values. For example, if the dotting sequence corresponds to (+1, +3, +1, +3, . . . ), the end of a dotting sequence may be quickly and accurately detected with the first occurrence of a value that does not follow the dotting sequence pattern. In this way, dotting detector 110 is able to open switch 106 very quickly after the end of each dotting sequence, thereby maintaining the accuracy of the frequency offset compensation.

The filtering of dotting detector 110 may also delay the detection of the start of a dotting sequence when using the perpendicular average <P>. As a result, the resumption of updating the rotation angle $\theta_N$ from phase tracker 108 to rotator 104 may also be delayed. This may actually be advantageous, because the delay will allow the processing performed by phase tracker 108 to filter out the effects of having continued to characterize the rotation angle $\theta_N$ during the non-dotting sequences. In an alternative implementation of the present invention, another switch, also controlled by dotting detector 110, could be added to the path between rotator 104 and phase tracker 108 to prevent continued generation of rotation angles $\theta_N$ during non-dotting sequences. Alternatively or in addition, the closing of switch 106 by dotting detector 110 after detection of a high perpendicular average <P> can be further delayed, if desired, by waiting for a specified number of dotting symbols (e.g., 15) in a row to be detected at the beginning of a dotting sequence.

Figure 3:
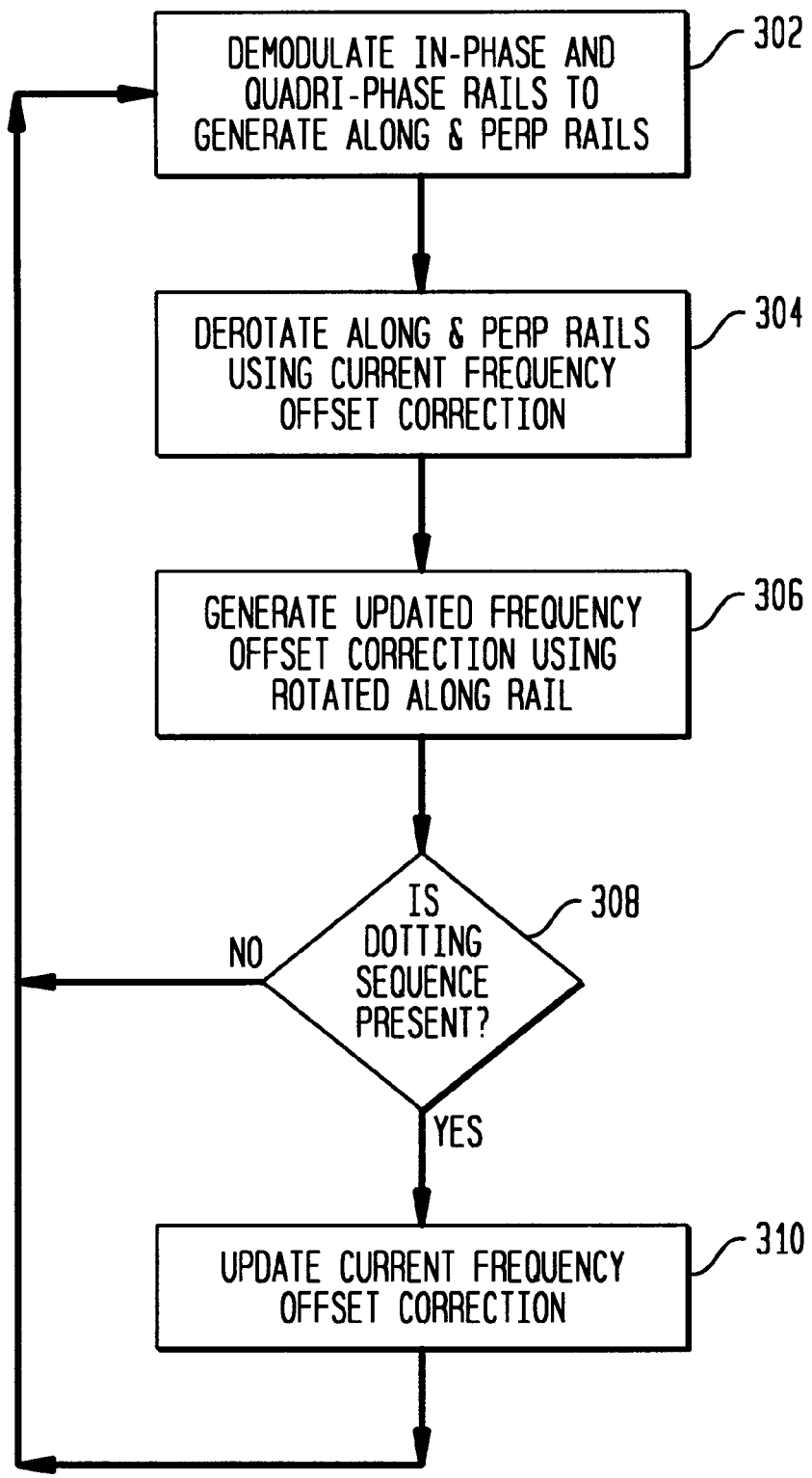
FIG. 3 is a flow diagram of the processing implemented by the frequency offset compensator of FIGS. 1 and 2.

Referring now to FIG. 3, there is shown a flow diagram of the processing implemented by frequency offset compensator 100 of FIGS. 1 and 2. Demodulator 102 demodulates the in-phase and quadri-phase rails to generate the along and perpendicular rails (step 302 of FIG. 3). Rotator 104 rotates the along and perpendicular rails using the current value of the rotation angle generated by phase tracker 108 to correct for frequency offset (step 304). Phase tracker 108 generates updated rotation angle values corresponding to the frequency offset correction using the rotated along rail generated by rotator 103 (step 306). If, based on analyzing the rotated perpendicular rail, dotting detector 110 determines that a dotting sequence is present (step 308), then the frequency offset correction used by rotator 104 is updated by allowing the rotation angles generated by phase tracker 108 to flow through switch 106 (step 310). Otherwise, the rotation angle is not updated and the previous frequency offset correction continues to be applied by rotator 104 during non-dotting sequences.

Those skilled in the art will understand that, in mobile telephone networks comprising bases and cordless phones, frequency offsets can also occur within the base. In such a system, the following problem can occur: One handset can false lock to another handset when the second handset is attempting to set up a link with the base. The first handset erroneously wakes up during the dotting sequence transmitted by the second handset and thinks that the base is trying to set up a call to the first handset, even though it is the second handset that is actually dotting to the base.

In one possible implementation of the present invention, this problem is addressed by selecting a dotting sequence for base-to-handset transmissions (e.g., +1, +3, +1, +3, . . . ) that is different from dotting sequence used for handset-to-base transmissions (e.g., −1, −3, −1, −3, . . . ). The signs of the averages on the along and perpendicular rails given by Equations (6) and (7) will be opposite for these two signals. As such, the perpendicular average can be used to determine whether a detected dotting sequence corresponds to a base-to-handset signal or a handset-to-base signal.

In this example, if the perpendicular average is greater than an appropriate positive threshold, then the received signal corresponds to base-to-handset transmissions. If, on the other hand, the perpendicular average is less than an appropriate negative threshold, then the received signal corresponds to handset-to-base transmissions. Since the sign of the rotation angle generated from the along average is also reversed (i.e., the sign in Equation (6)), that sign difference must be taken into account when rotating the received signal to compensate for the characterized frequency offset (i.e., to determine whether the rotation should be clockwise or counter-clockwise).

In peer communication (e.g., handset-to-handset or walkie-talkie mode), a button switch on the handset may be provided to flip the algorithm of frequency offset compensator 100 to enable one of the handsets to emulate the operations of the base.

In compensator 100 of FIG. 1, the beginnings of dotting sequences are detected using the perpendicular average and the ends of dotting sequences are detected by analyzing the data encoded to determine a non-dotting sequence value. In alternative embodiments of the present invention, both the beginnings and ends of dotting sequences can be detected by analyzing the encoded data for the presence and absence of the dotting sequence values.

Compensator 100 was described in the context of differential quadrature phase shift key modulation. It will be understood that the present invention can be implemented to detect and correct for frequency offsets in types of signals other than DQPSK. In general, the invention may be applied to any signals in the generic family of continuous phase modulated signals.

In compensator 100, the dotting sequence was (+3, +1, +3, +1, . . . ). Those skilled in the art will understand that the present invention may be implemented using other dotting sequences, as appropriate to the particular modulation scheme.

The present invention provides advantages over the prior art. By providing a scheme for compensating for large frequency offsets, the present invention enables communications equipment such as cordless telephones to be implemented using relatively inexpensive local oscillators, rather than the expensive oscillators used in the prior art to keep frequency offset small. In addition, the present invention provides digital frequency offset compensation, thereby alleviating the need for analog frequency locked loop circuitry and further reducing hardware costs and saving on power consumption.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for compensating for frequency offset in a received signal having dotting sequences, comprising the steps of:

(a) generating along rail and perpendicular rail components of the received signal, wherein:
      a first set of rail components comprises one of the along rail components and the perpendicular rail components; and
      a second set of rail components comprises the other of the along rail components and the perpendicular rail components; and
   rotating the received signal by a rotation angle to compensate for frequency offset, wherein:
      the rotation angle is generated from the first set of rail components;
      the rotation angle is updated only during specific update periods;
      the beginning of each update period is detected by comparing an average value generated from the second set of rail components to a threshold value, such that there is a delay between the beginning of each dotting sequence and the beginning of each update period; and
      the end of each update period is detected by analyzing decoded values in the received signal for values not corresponding to a dotting sequence to identify an initial value following the end of each dotting sequence, such that there is minimal delay between the end of each dotting sequence and the end of each update period.

2. The invention of claim 1, wherein the received signal is encoded using multi-phase shift key modulation.

3. The invention of claim 2, wherein the received signal is encoded using differential quadrature phase shift key modulation.

4. The invention of claim 1, wherein:
   the first set of rail components comprises the along rail components; and
   the second set of rail components comprises the perpendicular rail components.

5. The invention of claim 1, wherein an additional delay is added to further delay the start of each update period following the start of each dotting sequence.

6. The invention of claim 1, wherein the rotation angle is generated during both dotting and non-dotting sequences, but only updated during the specific update periods.

7. An apparatus for compensating for frequency offset in a received signal having dotting sequences, comprising:

(a) a rotator adapted to receive a rotation angle and rotate along rail and perpendicular rail components of the received signal to generate rotated along rail and rotated perpendicular rail components;

(b) a dotting detector adapted to use the rotated perpendicular rail components to detect occurrences of the dotting sequences;

(c) a phase tracker adapted to use the rotated along rail components to generate the rotation angle; and (d) a switch adapted to be controlled by the dotting detector to enable updating of the rotation angle to the rotator only during specific update periods, wherein:
      the beginning of each update period is detected by comparing an average value generated from the rotated perpendicular rail components to a threshold value, such that there is a delay between the beginning of each dotting sequence and the beginning of each update period; and
      the end of each update period is detected by analyzing decoded values in the received signal for values not corresponding to a dotting sequence to identify an initial value following the end of each dotting sequence, such that there is minimal delay between the end of each dotting sequence and the end of each update period.

8. The invention of claim 7, further comprising a demodulator adapted to receive in-phase and quadri-phase components of the received signal and generate the along rail and the perpendicular rail components of the received signal.

9. The invention of claim 7, wherein the received signal is encoded using multi-phase shift key modulation.

10. The invention of claim 7, wherein an additional delay is added to further delay the start of each update period following the start of each dotting sequence.

11. The invention of claim 7, wherein the phase tracker generates the rotation angle during both dotting and non-dotting sequences, but the rotation angle is only updated to the rotator during the specific update periods.

* * * * *